No. 743,125. Patented November 3, 1903.

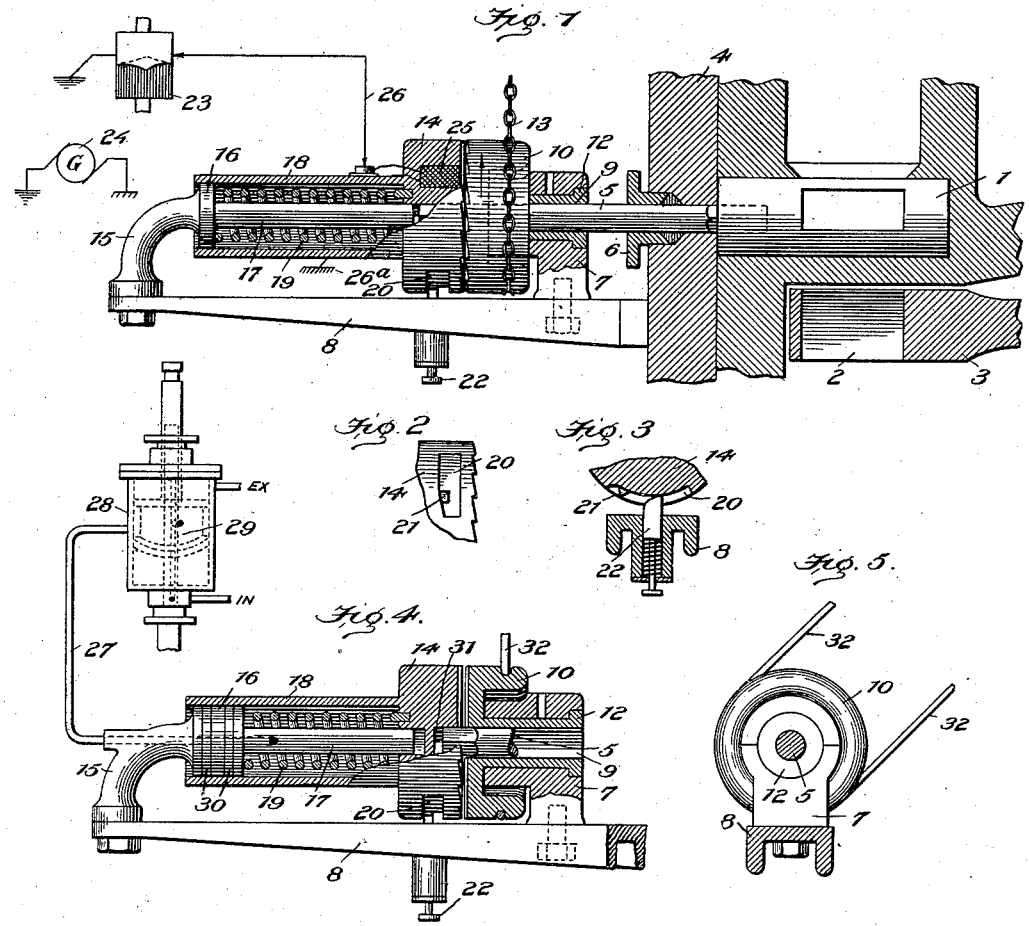

UNITED STATES PATENT OFFICE.

JAMES WILKINSON, OF BIRMINGHAM, ALABAMA, ASSIGNOR TO THE WILKINSON STEAM TURBINE COMPANY, A CORPORATION OF ALABAMA.

GOVERNING MECHANISM FOR TURBINES.

SPECIFICATION forming part of Letters Patent No. 743,125, dated November 3, 1903.

Application filed July 20, 1903. Serial No. 166,282. (No model.)

*To all whom it may concern:*

Be it known that I, JAMES WILKINSON, a citizen of the United States, residing at Birmingham, in the county of Jefferson and State of Alabama, have invented certain new and useful Improvements in Governing Mechanism for Turbines, of which the following is a specification.

My invention relates to improvements in governing devices for elastic-fluid turbines in which a mechanical relay-power under the control of a speed-governor is utilized to operate the supply-valves of the turbine.

It is the object of my invention to reduce to a minimum the amount of power which the governor must develop to operate the turbine-valves by providing a series of continually-rotating clutch-disks driven from the turbine itself or any other source of mechanical power other than the governor whose motion is used to throw the valve-operating clutches moved into engagement therewith by the governing device to open the supply-valves, which are automatically disengaged therefrom and returned to the "valve-closed" position by springs. The governor-power may be either electric or hydraulic, and since it is only required to shift the valve-operating or oscillatory clutches it is obvious that a great number of supply-valves may be controlled thereby with but little power being exerted by the governor. This is of material and practical importance in view of the fact that the supply and stage valves generally in use are unbalanced when closed and require no insignificant power to open them against the pressure in the turbine, so that when a great number of these valves are used the governor device, which cannot successfully supply a large power, is unable to operate them.

My invention consists in the construction and arrangements of parts hereinafter set forth and described, reference being had to the accompanying drawings, forming a part hereof, and in which—

Figure 1 is a side view, partly broken away, of an electrically-controlled clutch-relay power to operate a rotary turbine-valve. Fig. 2 is a detail view of the wedge-shaped recess and keeper therein formed in the governor-controlled clutch member. Fig. 3 is a vertical section through Fig. 2, showing the spring-latch in the recess. Fig. 4 shows a hydraulic-pressure-controlled clutch mechanism similar to that of Fig. 1. Fig. 5 is an end view of the revolving clutch member driven from a relay source of power. Figs. 6 and 7 are detail views showing in elevation the governor-controlled and relay-clutch members respectively. Fig. 8 illustrates the manner of gearing a series of relay-clutches together to drive them all from the same belt or chain.

The same reference-numerals refer to the same parts throughout.

A rotary stage or supply valve 1 operates to admit pressure through a nozzle to a peripheral row of vanes or buckets 2, carried by a rotor-wheel 3, keyed to the turbine-shaft, which is not shown, since this invention relates particularly to the mechanism for operating said valve. Through an opening in the outer shell 4 of the turbine a stem 5 passes, and its squared end enters a correspondingly-shaped central recess in an outer end of valve 1. A packing-gland 6 surrounds this stem to prevent the leakage of fluid-pressure from the turbine. A sectional bearing 7, mounted on a horizontal bracket or arm 8, secured to the turbine, supports the stem 5 in a tubular sleeve 9, which is integral with a rotating clutch member 10 and turns therewith in said bearing, being lubricated through an opening 11. The inner end of this sleeve is shouldered at 12 to prevent longitudinal movement in one direction, while the inner wall of the clutch member abuts against said bearing 7 to prevent movement in the other direction. In this manner the clutch member 10, which is continuously driven by a chain 13, deriving its motion from the turbine's rotating parts or from any auxiliary source of mechanical power, rotates freely in bearing 7 and independently of stem 5, which passes on through a circular opening in the center of its face and enters an oppositely-disposed square opening in the face of the governor-controlled clutch member 14.

A bent arm 15, bolted to the outer end of bracket 8, is provided with a circular head 16 and a horizontal cylindrical rod or shaft 17, which passes through a tubular extension 18, carried by a clutch member 14 and serves as an axis upon which the latter rotates to open or close the valve 1 by turning stem 5. The head 16 serves as a bearing for the outer end of the tube 18, while the inner end of shaft 17 enters a central opening in the clutch member 14. A coiled spring 19 around shaft 17 is connected at one end to said head 16 and at the other to the clutch, which has on its outer periphery a wedge-shaped recess 20, (more clearly shown in Fig. 2,) and a keeper 21 therein adapted to be engaged by a spring-controlled latch 22, mounted on said bracket 8. If desired, the head 16 may be made adjustable on arm 15 to regulate the tension of the spring. The contiguous faces of the several clutch members are preferably radially serrated to insure a more positive engagement.

According to Fig. 1, an electromagnetic governor-control, such as has been described in my pending application Serial No. 136,229, filed December 22, 1902, is utilized to shift its rotating circuit-closing controller-collar 23, sensitive to variations in the turbine's load, and close the circuit between any suitable source of electrical energy 24 and the magnetic coils 25. Assuming the clutch member 10 to be rotating continuously and the clutch member 14 out of engagement therewith and moved to its valve-closed position by coiled spring 19, if then the coils 25 be energized their attractive force will move the member 14 against the action of said spring into engagement with the rotating clutch 10. This moves member 14 to a point where the latch 22 will bear against the wedged side of recess 20, which is so proportioned that the action of the latch against this wedged side as the member is rotated by contact with the relay-clutch face 10 will not break the engagement of the faces until the valve-clutch face has been rotated against the torsion of spring 19 about forty-five degrees. When this has occurred, the latch 22 will have ridden over keeper 21, which will hold the member in its "valve-open" position against spring 19 until the magnet 25 is deënergized by breaking the electric current. This will permit the spring to draw the valve-clutch face 14 still farther away from the relay-clutch, which will shift the keeper 21 out of engagement with the latch, when the torsion of the spring will immediately return the clutch-face to its valve-closed position. The spring 19 therefore has the double function of normally holding the clutch-faces widely apart and tending to return the valve-clutch face to its valve-closed position, and it will be noted that while the initial tension of the spring may be adjusted to any desired degree this tension is increased by the winding action on it when the valve is opened.

In Fig. 2 I have shown a hydraulic governor-control, in which case fluid under pressure is admitted to pipe 27 from a cylinder 28 under control of a suitable governor piston-valve 29. The pressure may be supplied by a pump within the cylinder or from an outside source, as shown. From pipe 27 the pressure is conducted through a passage-way 28 in arm 15 and shaft 17 into the tubular extension 18, which is made fluid-tight by increasing the length of head 16 to accommodate packing-rings 30. The circular opening in valve-clutch member 14 for shaft 17 is partitioned off at 31 from the square opening which receives the end of the valve-operating stem 5. When pressure is admitted to 18 by piston 29, it will act against the stationary head 16 to force the member 14 into engagement with the relay member 10, when the action will be the same as heretofore described, and when the piston 29 opens pipe 27 to atmospheric pressure in the cylinder spring 19 will act to close the valve, as when the clutch-face is demagnetized.

In Fig. 8 I have illustrated the manner in which a row of valves may all be operated by rotating clutch members driven by the same belt 32 from the relayed source of power, it being necessary to reverse the opening positions of alternate turbine-valves by reason of the different directions of rotation of the several clutch members. By this method the valves may be simultaneously operated across the stages of a compound turbine.

If desired, the construction may be altered so that the spring instead of the governing power may be used to open the valve, while the latter acts to close it.

By a "relay-power" I mean any power utilized to move the supply-valve which is independent of the governing or controlling power, with which, however, it coöperates to open or close the valve.

Both governor-controlled valve-operating mechanisms are designed to deliver to the turbine cotemporaneously constant streams and pulsatory blasts of elastic fluid proportioned to the load.

Having thus described my invention, what I claim as new, and desire to secure by Letters Patent, is—

1. In a governing mechanism for turbines, a supply-valve, a power-driven continuously-rotating element, a valve-operating element, and means to move said elements into engagement to actuate said valve.

2. In a governing mechanism for turbines, a supply-valve, a freely-rotating disk, and a valve-operating means moved intermittently into engagement with said rotating disk by a governing device.

3. In a governing mechanism for turbines, a supply-valve, a valve-operating member, a power-rotated clutch member and governor-controlled means to move said members into engagement to actuate said valve.

4. In a governing mechanism for turbines, a supply-valve having a stem and a movable member operatively connected thereto, in combination with a power-rotated relay member and means to intermittently move said members into engagement to actuate said valve.

5. In a governing mechanism for turbines, a supply-valve, a power-driven relay member, means to move said valve, and a valve-controlling device which intermittently moves said means into engagement with said power-driven member to open or close said valve.

6. In a governing mechanism for turbines, a supply-valve, a power-driven element, a governor-controlled valve-operating element, means to move said elements into engagement to actuate said valve, and means to automatically disengage said elements when the valve has been moved to its open or closed position.

7. In a governing mechanism for turbines, a supply-valve, a stem therefor, a clutch comprising a member for operating said valve and a power-driven relay member, and a governor means to move said members into engagement.

8. In a governing mechanism for turbines, a supply-valve, a stem therefor, a member operatively connected to said stem, a power-driven clutch member acting as a relay-power, a spring normally holding said members out of engagement, and a governor device acting to move them into engagement to operate said valve.

9. In a governing mechanism for turbines, a supply-valve, a spring normally holding said valve closed, a clutch comprising a power-driven member and a member which acts to open said valve when moved into engagement by the governor with said power-driven member, in combination with means to disengage said members and hold said valve member in its "valve-open" position until released by said governor.

10. In a governing mechanism for turbines, a supply-valve, a governor device, an independently-rotated element, a valve-actuating element moved into engagement with said rotating element by said governor, means to automatically disengage said elements and retain said valve in its open or closed position until released by said governor.

11. In a governing mechanism for turbines, a nozzle, a clutch having a power-rotated member and a governor-shifted oscillatory member, and means actuated by said oscillatory member to control the supply of fluid to said nozzle.

12. In a governing mechanism for turbines, a clutch having a power-rotated member and a governor-shifted oscillatory member, a supply-valve actuated by said governor member, a wedge-shaped recess and a keeper therein in said latter member, and a spring-latch acting in said recess.

13. In a governing mechanism for turbines a plurality of rotating clutch-faces each adapted to engage a valve-operating member subject to a governor-control, and power-driven means continuously rotating said clutch-faces for the purposes specified.

14. In a governing mechanism for turbines, a supply-valve, a power-driven element, a valve-operating element, and electromagnetic means to move said elements into engagement to actuate said valve.

15. In a governing mechanism for turbines, a supply-valve, a clutch mechanism comprising a power-driven member and a valve-operating member both formed as circular disks, and means to move said members into engagement.

In testimony whereof I affix my signature in presence of two witnesses.

JAMES WILKINSON.

Witnesses:
H. M. HASTON,
P. J. MAUBREY.